(12) United States Patent
Falberg

(10) Patent No.: US 6,675,486 B2
(45) Date of Patent: Jan. 13, 2004

(54) PORTABLE BANDSAW

(76) Inventor: William H. Falberg, 1017 Wheel Dr., Carbondale, CO (US) 81623

( * ) Notice: Subject to any disclaimer, the term of this patent is extended or adjusted under 35 U.S.C. 154(b) by 126 days.

(21) Appl. No.: 10/077,536

(22) Filed: Feb. 15, 2002

(65) Prior Publication Data

US 2002/0157264 A1 Oct. 31, 2002

Related U.S. Application Data

(60) Provisional application No. 60/275,195, filed on Feb. 23, 2001.

(51) Int. Cl.[7] ............................................... B23D 53/12
(52) U.S. Cl. ........................................................ 30/380
(58) Field of Search ............................ 30/380, 381, 383, 30/500; 83/810–812

(56) References Cited

U.S. PATENT DOCUMENTS

| | | | |
|---|---|---|---|
| 2,774,131 A | 12/1956 | Crane | |
| 3,084,723 A | 4/1963 | Hack | |
| 3,952,622 A | 4/1976 | Majus | |
| 4,160,320 A | * 7/1979 | Wikoff | 30/380 |
| 4,212,104 A | * 7/1980 | Wikoff | 30/380 |
| 4,242,798 A | * 1/1981 | Wikoff | 30/380 |
| 5,018,492 A | * 5/1991 | Wolf et al. | 30/381 |
| 5,107,738 A | 4/1992 | Aoyagi | |
| 5,178,052 A | 1/1993 | Hansen | |
| 5,193,518 A | 3/1993 | Moller et al. | |
| 5,251,525 A | * 10/1993 | Galloway | 30/380 X |
| 5,341,712 A | 8/1994 | D'Arcy | |
| 5,878,644 A | 3/1999 | Jasinski | |
| 5,992,025 A | * 11/1999 | Fricke | 30/381 |

* cited by examiner

*Primary Examiner*—Douglas D. Watts
(74) *Attorney, Agent, or Firm*—Dorr, Carson, Sloan, Birney & Kramer, P.C.

(57) ABSTRACT

A portable bandsaw has a bandsaw blade extending around a plurality of transport wheels driven by a motor. The frame of the bandsaw supports these components such that the center of gravity of the bandsaw coincides with the cutting edge of the bandsaw.

12 Claims, 6 Drawing Sheets

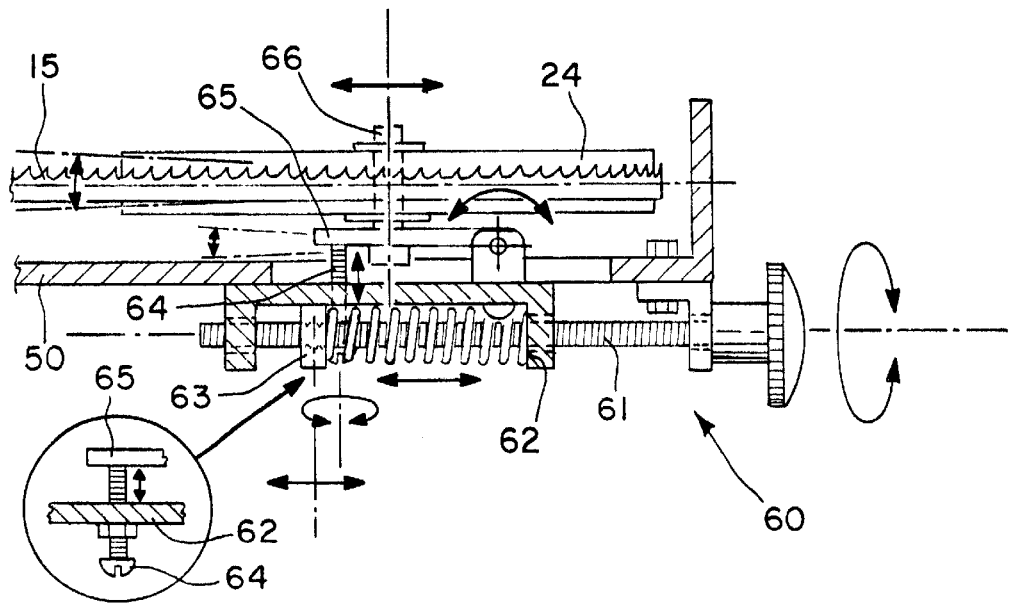
Fig. 6
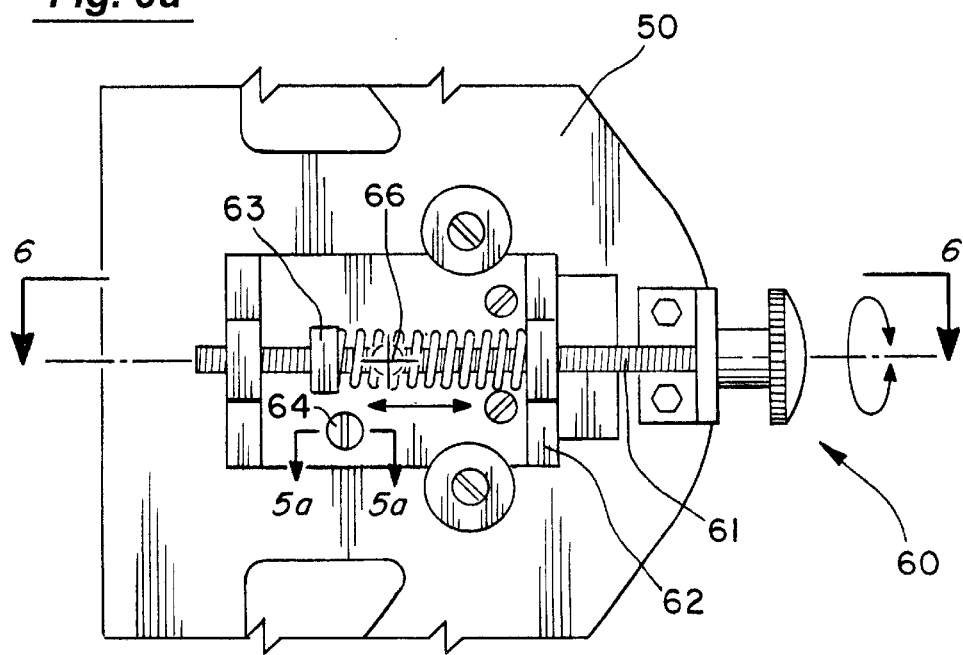
Fig. 5a
Fig. 5

PORTABLE BANDSAW

RELATED APPLICATION

The present application is based in part on, and claims priority to the Applicant's U.S. Provisional Patent Application No. 60/275,195, entitled "An Improved Bandsaw," filed on Feb. 23, 2001.

BACKGROUND OF THE INVENTION

1. Field of the Invention

The present invention relates generally to the field of bandsaws. More specifically, the present invention discloses a portable bandsaw that is balanced so that its center of gravity coincides with the cutting edge of the bandsaw blade.

2. Statement of the Problem

Bandsaws have been used for many years to cut wood, metal, plastics and other materials. A conventional bandsaw has a blade forming an endless loop that extends about two or more transport wheels. One of the wheels is driven by an electric motor to drive the bandsaw blade. The work piece is typically fed on a platen extending outward from the bandsaw blade so that the work piece will intersect the moving blade at a desired location and orientation. Conventional bandsaws are typically large, floor-mounted fixtures, which limits their mobility and also limits their ability to handle very large work pieces due to space constraints in most factories and workshops. In addition, when dealing with very large work pieces (e.g., logs or large timbers), it is much easier to move the saw relative to the work piece, rather than manipulating the work piece relative to the saw.

Therefore, a need exists for a portable bandsaw that can be readily transported for use at remote work sites or used to cut large work pieces. In addition, since there is no longer a large base for supporting the bandsaw, a portable bandsaw must have good handling and safety characteristics. In particular, a portable bandsaw should be carefully balanced so that its center of gravity coincides with the cutting edge of the blade to minimize the forces needed to control and manipulate the saw.

3. Prior Art

The prior art in this field includes a variety of bandsaws that enable the blade to pivot or tilt relative to the work piece, including the following:

| Inventor | U.S. Pat. No. | Issue Date |
| --- | --- | --- |
| Crane | 2,774,131 | Dec. 18, 1956 |
| Hack | 3,084,723 | Apr. 9, 1963 |
| Majus | 3,952,622 | Apr. 27, 1976 |
| Aoyagi | 5,107,738 | Apr. 28, 1992 |
| Hansen | 5,178,052 | Jan. 12, 1993 |
| Moller et al. | 5,193,518 | Mar. 16, 1993 |
| D'Arcy | 5,341,712 | Aug. 30, 1994 |
| Jasinski | 5,878,644 | Mar. 9, 1999 |

These references show a wide variety of bandsaws with blades that rotate, tilt, or pivot. For example, the bandsaws disclosed in the D'Arcy, Hack, and Jasinski patents have blades that tilt or pivot with respect to the bandsaw frame or the work piece.

Crane discloses a bandsaw with a manually-controllable power-drive feed for the work piece.

Majus discloses a vise-mounted bandsaw that enables the bandsaw blade to cut from the wide range of possible orientations.

Aoyagi discloses a bandsaw that is capable of cutting a work piece along two different directions.

Hansen discloses a bandsaw for cutting items of elastic material, such as foam rubber, in which the cutting mechanism is supported by rocker arms.

Moller et al. disclose a portable wire saw. Wheels attached to the base provide a pivot point so that the wire saw can be pivoted between a cutting position and a non-cutting position.

In addition to these patents, two portables bandsaws have been available on the market for several years. The portable bandsaw marketed under the MAFFELL trademark has two transport wheels with a motor driving the lower transport wheel. The portable bandsaw marketed under the OLIVER trademark has two transport wheels with a motor driving the upper transport wheel. In both cases, most of the weight is on one side of the blade due largely to the position and weight of the motor. This results in a bandsaw that is lopsided, ungainly, and relatively difficult to manipulate.

4. Solution to the Problem

None of the prior art references discussed above show a portable bandsaw having a center of gravity that coincides with the cutting edge of the bandsaw blade. The present invention provides a lightweight three-wheeled bandsaw in which the electric motor is positioned to serve as a counterweight to the frame and the other components of the bandsaw. This configuration results in a portable bandsaw that is well balanced, turns in either direction with little effort, and offers precise control in cutting along a desired path.

SUMMARY OF THE INVENTION

This invention provides a portable bandsaw having a bandsaw blade extending around a plurality of transport wheels driven by a motor. The frame of the bandsaw supports these components such that the center of gravity of the bandsaw coincides with the cutting edge of the bandsaw.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 5 is a side elevational view of the blade tensioning mechanism 60.

FIG. 5a is a detail cross-sectional view of portion of the blade tensioning mechanism.

FIG. 6 is a cross-sectional view of the blade tensioning mechanism 60 corresponding to FIG. 5.

DETAILED DESCRIPTION OF THE INVENTION

Figure 1:
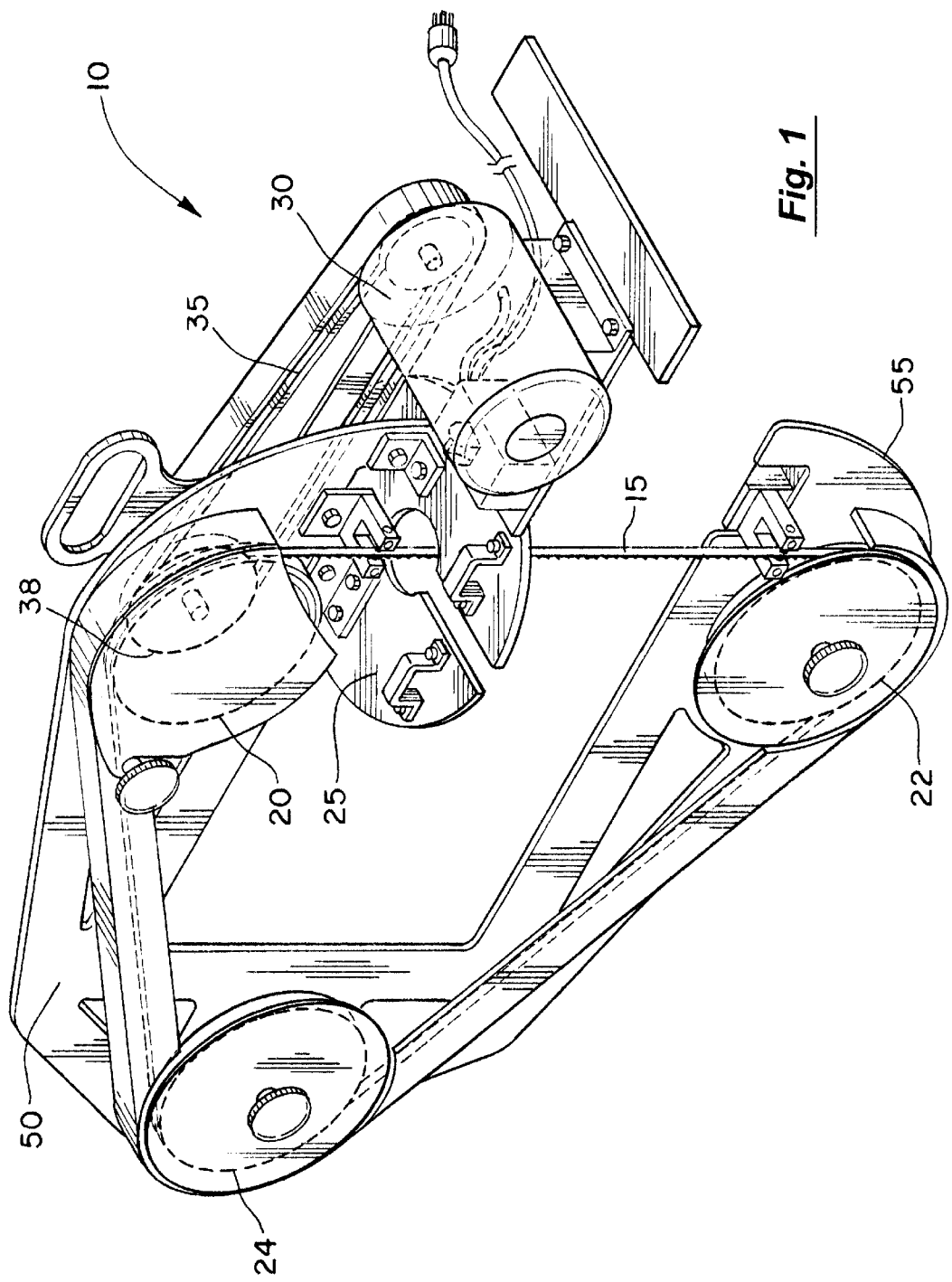
FIG. 1 is a top perspective view of the bandsaw.
Figure 2:
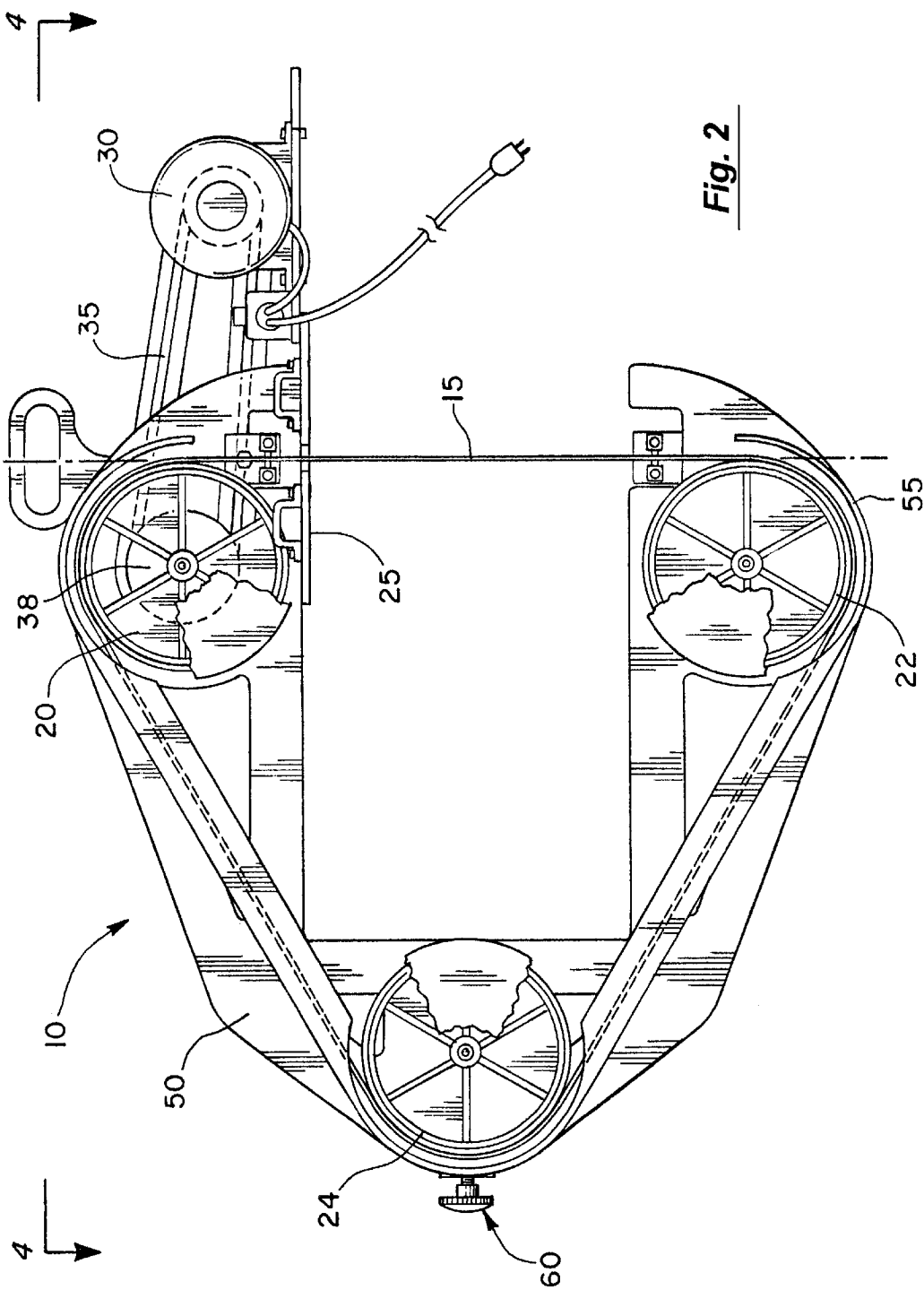
FIG. 2 is a side cross-sectional view of the bandsaw corresponding to FIG. 1.
Figure 3:
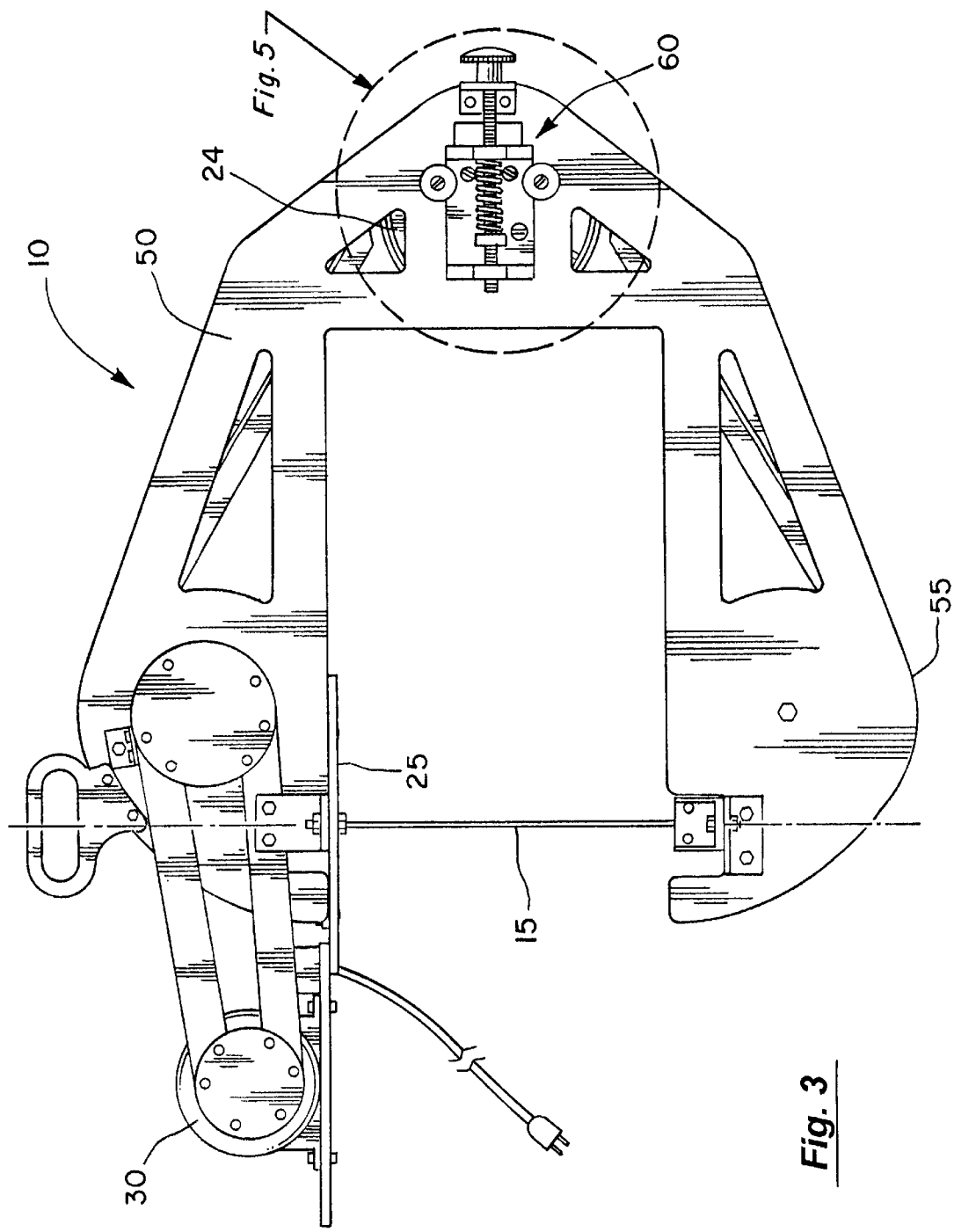
FIG. 3 is a right side elevational view of the bandsaw.
Figure 4:
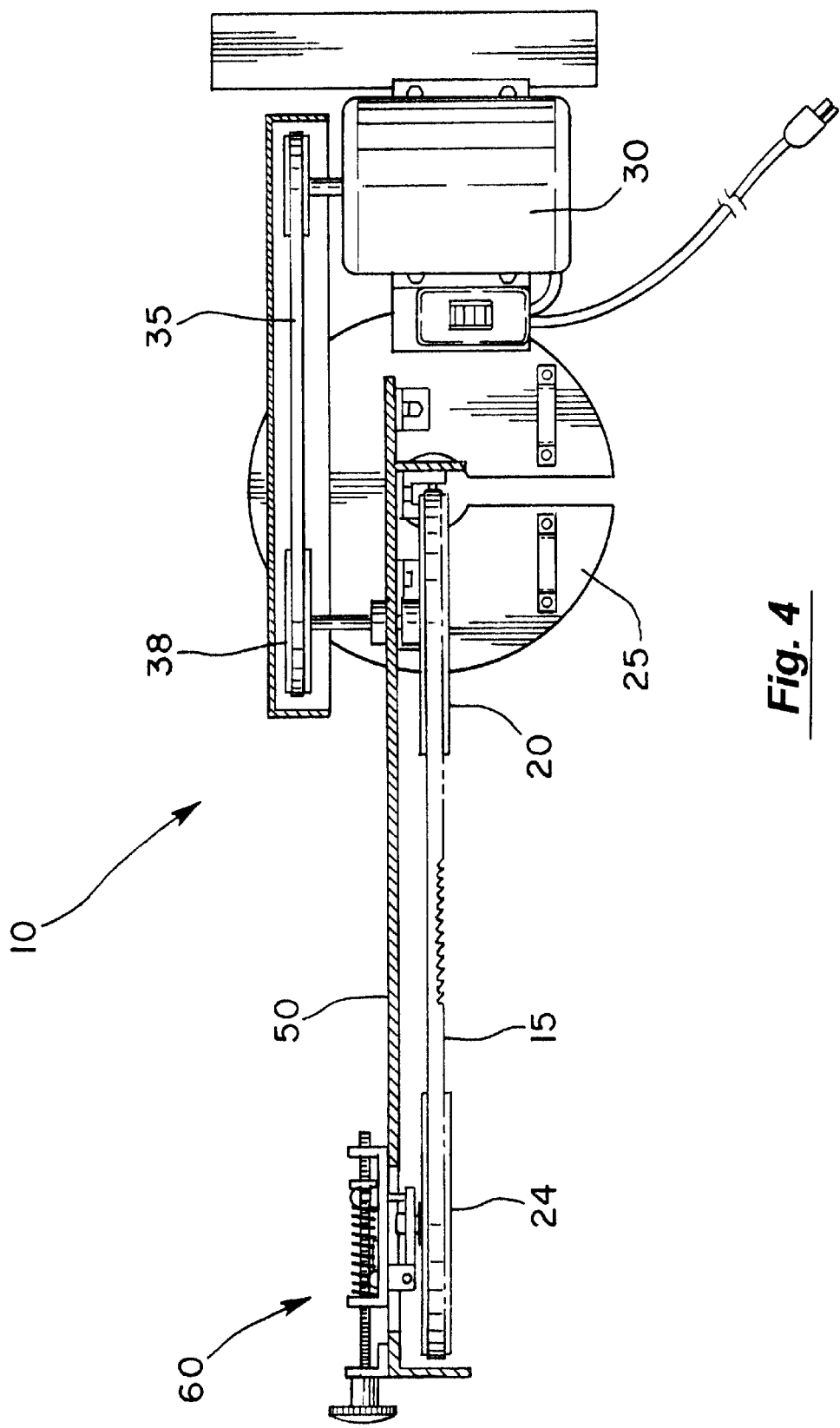
FIG. 4 is a cross-sectional view of the bandsaw taken along plane 4—4 in FIG. 2.

Turning to FIG. 1, a top perspective view is provided of the present bandsaw 10. FIG. 2 is a corresponding side cross-sectional view and FIG. 3 is a corresponding right side elevational view of the bandsaw 10. FIG. 4 is a cross-sectional view of the bandsaw taken along plane 4—4 in FIG. 2. Generally, the bandsaw 10 has a frame 50 that supports the remaining elements of the bandsaw. In the preferred embodiment of the present invention, the frame 50 is generally C-shaped, as shown in FIGS. 1 through 3. The throat of the frame 50 serves as an opening to accommodate a work piece as it is being cut. It should be understood that other configurations of the frame 50 are possible and should be included within the scope of the present invention.

The bandsaw blade 15 extends in a continuous loop around a plurality of transport wheels 20, 22 and 24 that are rotatably mounted to the frame 50. In the preferred embodiment, an upper transport wheel 20 is mounted above the throat of the frame 50 and a lower transport wheel 22 is mounted below the throat of the frame 50 in vertical alignment with the upper transport wheel 20. A third transport wheel 24 is mounted to the frame 50 at a point rearward from the upper and lower transport wheels 20 and 22. A series of teeth on one edge of the blade 15 are used to cut the work piece as the blade is directed around the transport wheels 20–24. In particular, the teeth on the front portion of the blade 15 between the upper and lower transport wheels 20 and 22 can be said to define the "cutting edge" of the blade 15 for cutting a work piece. The cutting edge of the blade 15 passes through a platen 25, which can be used to guide and support the bandsaw on a work piece as it is cut.

An electric motor 30 drives the blade 15 about the transport wheels 20–24. In particular, the motor 30 drives a drive belt 35 which rotates a pulley 38 connected to the upper transport wheel 20 as shown in FIGS. 1 and 2. However, other motor configurations are possible. Any of the transport wheels 20–24 could be driven by the motor.

Figure 7:
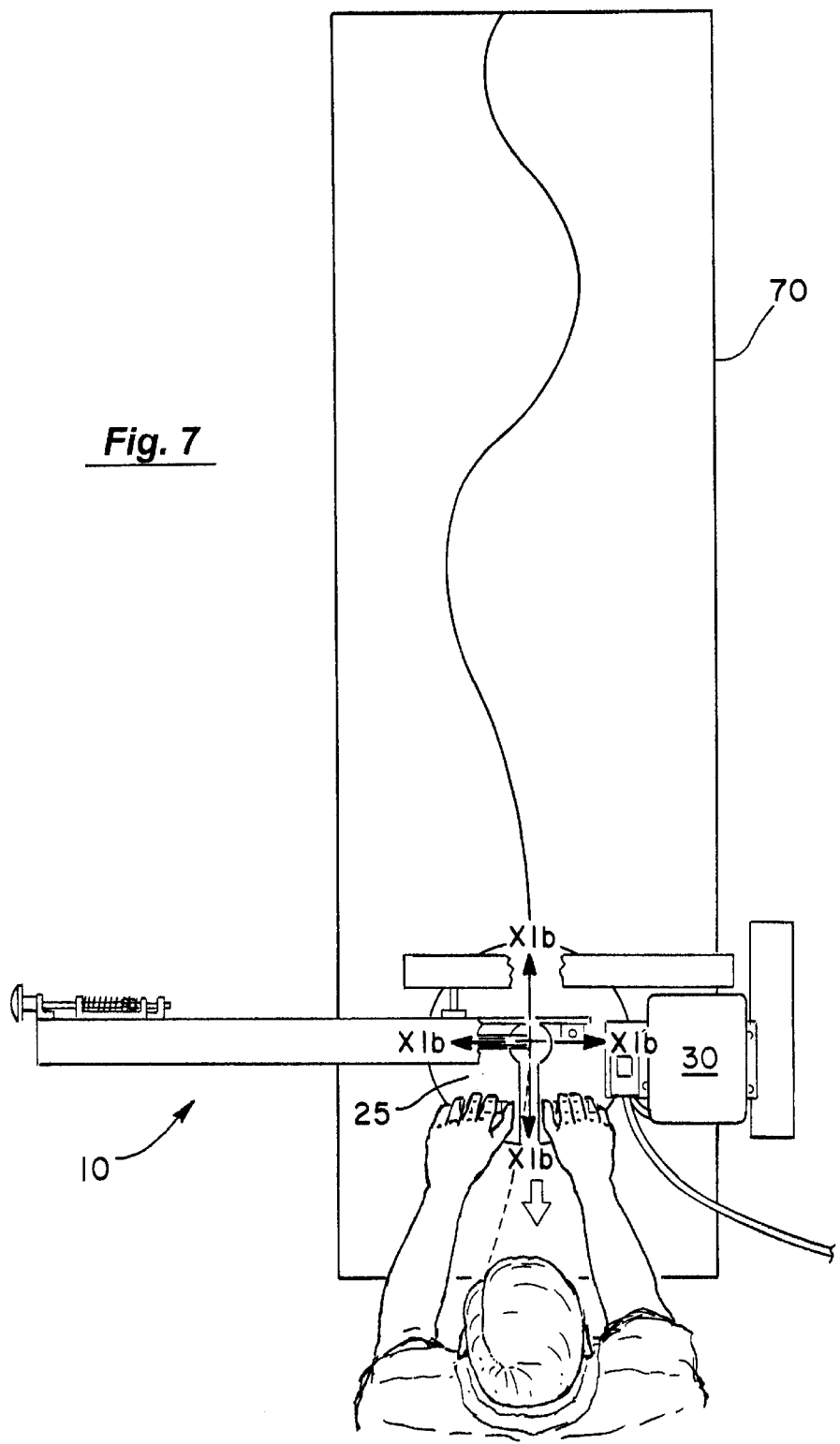
FIG. 7 is top view of the bandsaw 10 being used to make an arbitrarily curved cut through a large work piece 70.

It should be noted that the motor 30 is attached to the frame 50 at a position forward of the upper and lower transport wheels 20 and 22, so that the motor's weight (typically at least 15 pounds) offsets the weight of the third transport wheel 24 and the rear portion of the frame 50. As a result the center of gravity of the bandsaw (along an axis extending from front to rear) generally coincides with the cutting edge of the bandsaw blade 15. Similarly, all of the components are balanced so that the center of gravity along an orthogonal axis extending from left to right also generally coincides with the cutting edge of the blade 15. Thus, the bandsaw is evenly balanced both left-to-right and front-to-back. This enables to the user to cut a work piece and manipulate the bandsaw with minimal effort. For example, FIG. 7 is top view of the bandsaw 10 being used to make an arbitrarily curved cut through a large work piece 70.

If necessary, the bandsaw can be equipped with a mechanism (not shown) for adjusting its center of gravity along either axis. For example, an adjustable weight can be attached to the frame of the bandsaw. Alternatively, the position of a weight could be adjusted relative to the frame 50 and/or other components of the bandsaw to change its center of gravity (e.g., by sliding a weight on a rod).

FIGS. 1–3 depict an embodiment of the bandsaw having a frame 50 with a rounded bottom 55. This approach allows the bandsaw to be tilted forward or rearward, as needed, to accommodate large work pieces.

FIGS. 3 through 6 show the tension adjustment mechanism 60 used to adjust the position of the rear transport wheel 24. This, in turn, provides a means for adjusting the tension on the blade 15. FIG. 5 is a side elevational view of the blade tensioning mechanism 60 and FIG. 6 is a corresponding cross-sectional view. As illustrated in FIG. 6, the rear transport wheel 24 is rotatably mounted on a shaft 66. The base of this shaft 66 is pivotally attached to a sliding bracket 62 by means of a pivoting member 65. This sliding bracket 62 is constrained to slide relative to the frame 50 of the bandsaw along a predetermined longitudinal axis. The longitudinal position of the sliding bracket 62 can be adjusted relative to the frame 50 by rotating an adjustment screw 61 that is threaded through a nut 63 fixed to the sliding bracket 62. This enables the user to adjust the longitudinal position of the rear transport wheel 24 relative to the frame 50 of the bandsaw 10, which changes the length of the path around the transport wheels 20–24 for the blade 15 and thereby adjusts its tension.

The user can also adjust the degree of tilt of the rear transport wheel 24 by turning the tilt adjustment screw 64. This tilt adjustment screw is threaded through the sliding bracket 62 as illustrated in the detail cross-sectional view provided in FIG. 5a. The distal tip of the tilt adjustment screw 64 pushes against the free end of the pivoting member 65, thereby allowing the user to adjust the tilt of the rear transport wheel 24. A small degree of angular adjustment may be required to ensure that the blade 15 remains on the transport wheels 20–24.

The above disclosure sets forth a number of embodiments of the present invention. Other arrangements or embodiments, not precisely set forth, could be practiced under the teachings of the present invention and as set forth in the following claims.

I claim:

1. A portable bandsaw comprising:
   a motor;
   a plurality of transport wheels with at least one of the transport wheels being driven by the motor;
   a bandsaw blade extending about the transport wheels in a continuous loop with a predetermined section of the loop serving as a cutting edge for cutting a work piece; and
   a frame supporting the motor and transport wheels, so that the center of gravity of the bandsaw substantially coincides with the cutting edge of the bandsaw blade.

2. The bandsaw of claim 1 wherein the motor is located forward of the cutting edge of the bandsaw blade.

3. The bandsaw of claim 2 wherein the motor drives one of the transport wheels via a drive belt.

4. The bandsaw of claim 1 wherein a first transport wheel and a second transport wheel are located substantially in vertical alignment with the cutting edge of the bandsaw blade, and wherein a third transport wheel is located rearward from the cutting edge of the bandsaw blade.

5. The bandsaw of claim 1 further comprising a platen for supporting the bandsaw on a work piece being cut by the cutting edge of the bandsaw blade.

6. A portable bandsaw comprising:
   a frame;
   an upper transport wheel supported by the frame;
   a lower transport wheel supported by the frame in vertical alignment below the upper transport wheel;
   a motor attached to the frame in front of the transport wheels and driving at least one of the transport wheels; and
   a bandsaw blade extending about the transport wheels in a continuous loop with a predetermined front section of the loop serving as a cutting edge for cutting a work piece;

wherein the center of gravity of the bandsaw substantially coincides with the cutting edge of the bandsaw blade.

7. The bandsaw of claim 6 wherein the motor drives one of the transport wheels via a drive belt.

8. The bandsaw of claim 6 further comprising a third transport wheel located rearward from the upper and lower transport wheels.

9. The bandsaw of claim 6 further comprising a platen for supporting the bandsaw on a work piece being cut by the cutting edge of the bandsaw blade.

10. A portable bandsaw comprising:

a frame;

an upper transport wheel supported by the frame;

a lower transport wheel supported by the frame in vertical alignment below the upper transport wheel;

a third transport wheel located rearward from the upper and lower transport wheels;

a motor attached to the frame in front of the transport wheels and driving the upper transport wheel;

a bandsaw blade extending about the transport wheels in a continuous loop with a predetermined front section of the loop serving as a cutting edge for cutting a work piece; and wherein the center of gravity of the bandsaw substantially coincides with the cutting edge of the bandsaw blade.

11. The bandsaw of claim 10 wherein the motor drives the upper transport wheel via a drive belt.

12. The bandsaw of claim 10 further comprising a platen for supporting the bandsaw on a work piece being cut by the cutting edge of the bandsaw blade.

* * * * *